United States Patent Office

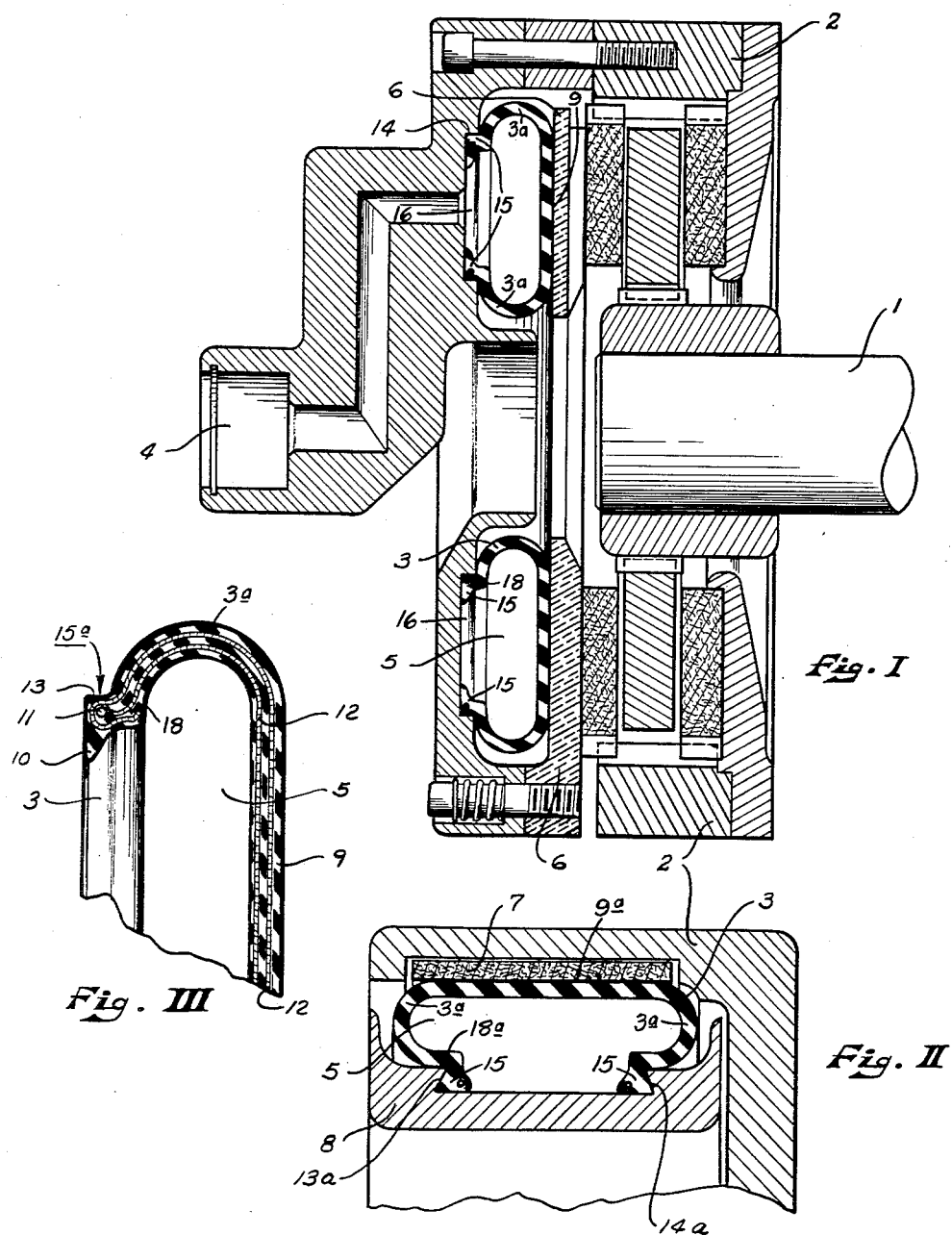

2,940,572
FLUID CLUTCH ACTUATORS

Charles P. Warman, Jr., P.O. Box 1150,
Wichita Falls, Tex.

Filed June 28, 1954, Ser. No. 439,731

10 Claims. (Cl. 192—88)

This invention relates to certain new and useful improvements in fluid clutch actuators for clutches and brakes and the like. A study of previous practice in the art reveals the use of two main types of fluid actuators for these uses, viz., the enclosed tube type and the diaphragm type, each having its peculiar advantages and disadvantages. The said enclosed tube type actuators having relative freedom from fluid leakage and relative ease of replacement by unskilled persons; and the disadvantages of high original cost and the capability of only limited expansive action before efficiency losses are noted. The diaphragm actuators are relatively lower in acquisition cost and are capable of designs which allow expansion to compensate for extremes in clutch facing or brake lining wear while retaining high operating efficiencies, but are subject to fluid leaks unless installed with considerable care by expert mechanics.

It is an object of this invention to provide a fluid propelled actuator for said uses which incorporates the best features of diaphragm type actuators and enclosed tube actuators, while eliminating the inherent disadvantages of such structures, and providing certain novel actions and features not formerly available in either of the aforementioned types.

A further object of this invention is to provide a fluid distensible actuator capable of being constructed so as to exert the actuating force in any of the manners employed in clutches and brakes discussed herein, whether axial thrust, expansive radial pressure, or constrictive radial pressure.

These and other objects of my invention will become readily apparent to those skilled in the art from the following description of possible specific forms of the device, reference being made for that purpose to the accompanying drawings in which:

Fig. I is a vertical cross section of a disc type clutch or brake assembly utilizing one form of my actuator.

Fig. II is a cross sectional view of one form of my actuator in use in a clutch or brake assembly, illustrating its adaptability in mechanisms of the type in which an expansive radial pressure is required.

Fig. III is a partial cross sectional view of my actuator removed from any associated part and showing one possible modification of construction details.

Referring to the several drawings, wherein like references indicate similar parts throughout the several views, 1 is a driving or driven shaft, according to the application of the assembly, and which is variously rotatively connected or disconnected with housing 2, such connection or disconnection of said parts being the function of the clutch or brake assembly as shown, and being effected by inflation or deflation of actuator 3 by the required movement of a suitable fluid through passageways 4 into annular cavity 5 of the actuator through the annular opening extending around its inner face. In the structure as illustrated in Fig. I such inflation causes the actuator to distend by flattening of the semi-circular sides 3a and exert a thrust, which is axial with respect to shaft 1, the magnitude of which varies directly with the magnitude of the fluid pressure. Said thrust is impressed through a clutch actuating surface 9 to heat insulator element 6 causing the conventional disc type clutch or brake mechanism to be engaged.

One of the elements of the clutch has an annular recess 16 having opposed sides 14 in Fig. I, which sides may also be undercut as at 14a in Fig. II. The resilient actuator 3 comprises a modified toroidal member having mutually opposed parallel actuator walls 9 and 18, joined by a pair of flexing end walls 3a of essentially semicircular cross-section. The actuator wall 18 is discontinuous to form an annular opening of width approximating the spacing between the centers of the semicircular flexing walls 3a, and the edges of the opening each terminate in a flange 15 standing normal to the plane of the actuator wall 18, the flanges 15 having heel surfaces 13. In Fig. II the heel surface is labeled 13a and makes an acute angle with the plane of the discontinuous actuator wall 18a so as to complement the shape of the undercut edge 14a of the recess.

In the structure as illustrated in Fig. II, inflation causes the actuator to distend radially outwardly from the element 8 to which it is attached at its inner actuating wall 18a, said actuator carrying at its outer actuating wall 9a a clutch or brake facing 7 to force contact with housing 2, causing housing 2 and element 8 to engage in a common rotational engagement.

Alternatively, it is clearly evident that by causing the actuator to be constructed so that face 9a lies in the inner diameter of the actuator body, and the flanges 15 including sealing lips 10 and beads 11 changed in according relation on the outer diameter, my actuator would then be properly adapted to generate restrictive radial thrust to achieve the desired result in properly associated mechanisms of the types here under consideration.

In a preferred form of actuator construction, that part of the actuator which forms the seal between the actuator and the mounting element is constructed as illustrated in Fig. III. Bead members 11, in the flange 15a, are made of wire, either single or stranded, or other similar material particularly adapted to resist tensile stresses such as will be imposed by forces of rotation generated during phases of operation of the assembly. Single or multiple plies of reinforcing 12 may be composed of fabric, or similar material in its various forms, and is imbedded in and bonded to the rubber or rubber-like material which composes the remainder of the actuator. It is significant that, in my actuator, no metal insert is employed which becomes external to, and/or passes through the rubber wall, such as is required in construction of the closed tube type actuator in order to provide air-tight connection means.

My actuator in any of its various forms is put into operation by first causing the part to be fabricated according to conventional bonding and molding techniques ordinarily employed in the manufacture of similar items. Final structural shape at the inner surface of the actuator in the vicinity of the flanges, including sealing lips 10 and/or heels 13, or 13a as a possible variation, is formed during the molding operation. Annular recesses 16 including sides 14 or undercut lock type sides 14a are provided in the clutch or brake housing to receive heels 13 or 13a respectively. The combination of lock type sides 14a and acute angled heel surfaces 13a is indicated advisable when, as illustrated in Fig. II, the construction of the mechanism is such that rotation generates centrifugal forces tending to remove actuator 3 from its proper location within the assembly. Such tendency is also resisted by bead wires 11. Factory or field installation of my actuator into a clutch or brake mechanism is complete by simply pressing into place by hand, involving no multiple screw, or other fastenings, such as relied upon to both hold in place and prevent fluid leakage around diaphragm type actuators. By forming the related parts to interference dimensions, as well as by utilizing the spring-like tendencies of bead 11, an initial seal will be provided between the actuator and its associated part face. Upon inflation of the actuator the initial mechanical seal is aided by the inflation medium. Both these tendencies, the initial mechanical seal and the pressure seal, can be maximized by provision of lip 10 in the modification as illustrated in Figs. I and III.

It will be understood by those skilled in the art that variations and modifications of the specific forms herein shown and described, for purposes of illustration, may be made without departing from the spirit and scope of the invention.

What I claim is:

1. An inflatable actuator for rotating clutches, said actuator comprising a resilient modified toroidal member having an axis and having a pair of mutually parallel opposed actuator walls joined by a pair of mutually opposed end walls, the latter comprising convex flexing walls of the actuator and being substantially semi-circular about mutually spaced centers in all cross-sections taken in planes including said axis, and one of the opposed actuator walls being discontinuous to form an annular opening concentric with said axis and of width approximating the spacing between the respective centers of said semi-circular flexing walls and each edge of the discontinuous wall adjacent the opening terminating in a flange standing substantially normal to the plane of said discontinuous wall and extending away from the opposite actuator wall, the two flanges each having a heel surface meeting the adjacent outer surface of said discontinuous wall at an angle no greater than 90°.

2. In an actuator as set forth in claim 1, said angle being an acute angle.

3. In an actuator as set forth in claim 1, the two flanges each having a resilient sealing lip extending toward the other flange and the surfaces of said sealing lips which face away from the toroid member being coaxial with said actuating surfaces.

4. In an actuator as set forth in claim 3, said angle being an acute angle.

5. In an actuator as set forth in claim 1, reenforcing beads imbedded and bonded in at least one of said flanges to increase the tensile strength thereof opposing distortion of the flanges during rotation.

6. In combination, a clutch including an element with an annular recess having opposed sides, and an actuator comprising a resilient modified toroidal member having an axis and having a pair of mutually parallel opposed actuator walls joined by a pair of mutually opposed end walls, the latter comprising convex flexing walls of the actuator and being substantially semi-circular about mutually spaced centers in all cross-sections taken in planes including said axis, and one of the opposed actuator walls being discontinuous to form an annular opening concentric with said axis and of width approximating the spacing between the respective centers of said semi-circular flexing walls and each edge of the discontinuous wall adjacent the opening terminating in a flange standing substantially normal to the plane of said discontinuous wall and extending away from the other actuator wall, the two flanges each having a heel surface meeting the adjacent outer surface of said discontinuous wall at an angle no greater than 90° and complementary with the sides of said recess.

7. In a combination as set forth in claim 6, said recess sides being undercut and said angle being an acute angle.

8. In a combination as set forth in claim 6, the two flanges each having a resilient sealing lip extending toward the other flange and overlying at least part of the surface of said recess between said opposed sides.

9. In a combination as set forth in claim 8, said recess sides being undercut and said angle being an acute angle.

10. In a combination as set forth in claim 6, reenforcing beads imbedded and bonded in at least one of said flanges to increase the tensile strength thereof opposing distortion of the flanges during rotation.

References Cited in the file of this patent

UNITED STATES PATENTS

| Number | Name | Date |
|---|---|---|
| 590,095 | Dunn | Sept. 14, 1897 |
| 1,401,148 | Fording | Dec. 27, 1921 |
| 1,759,755 | Lindner | May 20, 1930 |
| 1,999,675 | White | Apr. 30, 1935 |
| 2,120,182 | Limpp | June 7, 1938 |
| 2,193,481 | Fawick | Mar. 12, 1940 |
| 2,203,862 | Eason | June 11, 1940 |
| 2,251,444 | Fawick | Aug. 5, 1941 |
| 2,286,873 | Schwartz | June 16, 1942 |
| 2,367,776 | Hollerith | Jan. 23, 1945 |
| 2,437,737 | Halby | Mar. 16, 1948 |
| 2,446,694 | Dickson | Aug. 10, 1948 |
| 2,662,625 | Fawick | Dec. 15, 1953 |
| 2,673,573 | Fawick | Mar. 30, 1954 |

FOREIGN PATENTS

| Number | Country | Date |
|---|---|---|
| 330,412 | Germany | Dec. 14, 1920 |
| 684,261 | Great Britain | Dec. 17, 1952 |
| 856,565 | Germany | Nov. 24, 1952 |